United States Patent
Art et al.

(10) Patent No.: US 7,288,917 B2
(45) Date of Patent: Oct. 30, 2007

(54) TRANSMITTER FOR RADIO-CONTROLLED TOY

(75) Inventors: Harrelson Art, Kennedale, TX (US); Wai Hui, Kowloon (CN)

(73) Assignee: Radio Shack Corporation, Fort Worth, TX (US)

( * ) Notice: Subject to any disclaimer, the term of this patent is extended or adjusted under 35 U.S.C. 154(b) by 721 days.

(21) Appl. No.: 10/260,801

(22) Filed: Sep. 30, 2002

(65) Prior Publication Data
US 2004/0061479 A1    Apr. 1, 2004

(51) Int. Cl.
*H02J 7/00*    (2006.01)
(52) U.S. Cl. .................... 320/107; 446/456
(58) Field of Classification Search ........ 320/125, 320/132, 107, 109, 122, 149; 446/454, 456, 446/462, 463, 465, 175, 484, 93, 455
See application file for complete search history.

(56) References Cited

U.S. PATENT DOCUMENTS

| | | | |
|---|---|---|---|
| 2,587,142 A | 2/1952 | Gray et al. ............... 446/94 |
| 2,788,613 A | 4/1957 | Gelfand ................ 446/429 |
| 3,471,963 A | 10/1969 | Tomiyama .............. 446/429 |
| 3,629,968 A | 12/1971 | Linstead ................ 446/430 |
| 3,638,356 A | 2/1972 | La Branche ............ 446/465 |
| 3,803,756 A | 4/1974 | Strongin ................ 446/429 |
| 4,120,118 A * | 10/1978 | Mathews et al. ........ 446/144 |
| 4,219,962 A | 9/1980 | Dankman et al. ....... 446/409 |
| 4,345,402 A | 8/1982 | Hanson et al. ......... 446/430 |
| 4,358,104 A | 11/1982 | Rivette et al. ......... 446/454 |
| 4,511,342 A | 4/1985 | Hart et al. .............. 446/429 |
| 4,547,166 A | 10/1985 | Goldfarb et al. ........ 446/164 |
| 4,563,626 A | 1/1986 | Ohtake .................. 320/103 |
| 4,575,354 A | 3/1986 | Wakayama et al. ..... 446/437 |
| 4,643,696 A | 2/1987 | Law ...................... 446/465 |
| 4,690,654 A | 9/1987 | DeLaney ................. 446/28 |
| 4,690,656 A | 9/1987 | Friedman et al. ........ 446/95 |
| 4,693,696 A | 9/1987 | Buck ..................... 446/224 |
| 4,722,115 A | 2/1988 | Yang ....................... 16/45 |
| 4,732,569 A | 3/1988 | Hippely et al. .......... 446/430 |
| 4,813,903 A | 3/1989 | Furukawa et al. ........ 446/90 |

(Continued)

FOREIGN PATENT DOCUMENTS

DE    29611499    10/1996

(Continued)

OTHER PUBLICATIONS

Tower Hobbies Catalog, p. 38, 1991.

(Continued)

*Primary Examiner*—Karl Easthom
*Assistant Examiner*—Aaron Piggush
(74) *Attorney, Agent, or Firm*—Haynes and Boone, LLP

(57) ABSTRACT

A mobile toy is described. The mobile toy includes a wheel assembly having a hubcap for removably engaging a wheel of the wheel assembly. The mobile toy may also include a transmitter having a charging pad for charging of a radio-controlled embodiment of the toy. The transmitter comprises an indicator showing certain states of the toy as well as a storage compartment for housing items associated with the toy. Additional embodiments include an assembly for retaining the toy on the charging pad during charging of the toy. A kit for storing the components of the radio-controlled embodiment of the toy is also described.

5 Claims, 6 Drawing Sheets

U.S. PATENT DOCUMENTS

| | | | |
|---|---|---|---|
| 4,882,942 A | 11/1989 | Hamilton | 74/104 |
| 4,895,542 A | 1/1990 | de Blanitza | 446/94 |
| 4,963,115 A | 10/1990 | Stowell Davin et al. | 446/96 |
| 4,993,983 A | 2/1991 | Kurita et al. | 446/94 |
| 4,993,985 A | 2/1991 | Bass et al. | 446/133 |
| 5,090,934 A | 2/1992 | Quercetti | 446/93 |
| 5,127,658 A | 7/1992 | Openiano | 446/130 |
| 5,158,495 A * | 10/1992 | Yonezawa | 446/456 |
| 5,229,703 A | 7/1993 | Harris | 320/107 |
| 5,334,075 A * | 8/1994 | Kakizaki et al. | 446/438 |
| 5,334,076 A * | 8/1994 | Shinozuka | 446/456 |
| D350,572 S | 9/1994 | Vashey | D21/566 |
| 5,364,300 A | 11/1994 | Jow | 446/437 |
| 5,411,428 A | 5/1995 | Orii et al. | 446/90 |
| 5,487,692 A | 1/1996 | Mowrer et al. | 446/465 |
| D381,710 S | 7/1997 | Kato | D21/548 |
| D395,472 S | 6/1998 | Kanetsuna et al. | D21/566 |
| 5,767,655 A | 6/1998 | Ostendorff et al. | 320/107 |
| 5,785,572 A * | 7/1998 | Levy et al. | 446/144 |
| 5,816,882 A | 10/1998 | Guegan et al. | 446/123 |
| 5,871,386 A | 2/1999 | Bart et al. | 446/460 |
| 5,885,159 A | 3/1999 | DeAngelis | 463/39 |
| 5,902,018 A | 5/1999 | Owen et al. | 301/111.04 |
| 5,908,345 A | 6/1999 | Choi | 446/436 |
| 5,944,607 A | 8/1999 | Crane | 463/39 |
| 5,989,096 A | 11/1999 | Barton et al. | 446/425 |
| 6,014,597 A | 1/2000 | Kochanneck | 701/22 |
| 6,036,574 A | 3/2000 | Halford | 446/429 |
| 6,083,104 A | 7/2000 | Choi | 463/6 |
| 6,097,112 A | 8/2000 | Kondo | 307/125 |
| 6,179,686 B1 | 1/2001 | Ogawa et al. | 446/429 |
| 6,222,348 B1 * | 4/2001 | Sato et al. | 320/149 |
| 6,244,260 B1 * | 6/2001 | Ragoza et al. | 124/34 |
| 6,247,994 B1 | 6/2001 | DeAngelis et al. | 446/454 |
| 6,250,987 B1 | 6/2001 | Choi | 446/436 |
| D455,465 S | 4/2002 | Yamazaki | D21/566 |
| D456,050 S | 4/2002 | Bao | D21/566 |
| 6,390,883 B1 | 5/2002 | Choi | 446/436 |
| 6,406,049 B1 * | 6/2002 | Jimison et al. | 280/288.4 |
| 6,488,390 B1 * | 12/2002 | Lebens et al. | 362/231 |
| 6,586,942 B2 | 7/2003 | Lam | 446/26 |
| 6,607,041 B2 * | 8/2003 | Suzuki et al. | 173/4 |
| 6,612,893 B2 * | 9/2003 | Rehkemper et al. | 446/34 |
| 6,632,121 B2 | 10/2003 | Edmisson et al. | 446/471 |
| 6,663,463 B1 | 12/2003 | Dougherty et al. | 446/409 |
| D485,587 S | 1/2004 | Hui | D21/566 |
| 6,764,373 B1 * | 7/2004 | Osawa et al. | 446/175 |
| 6,777,373 B1 * | 8/2004 | Carmello et al. | 502/346 |
| 6,913,507 B2 * | 7/2005 | Hui | 446/429 |
| 2001/0006313 A1 | 7/2001 | Kikuchihara et al. | 310/89 |
| 2002/0094752 A1 | 7/2002 | Kaneko et al. | 446/466 |
| 2002/0132556 A1 * | 9/2002 | So | 446/456 |
| 2002/0160688 A1 | 10/2002 | Rehkemper et al. | 446/454 |
| 2002/0182974 A1 * | 12/2002 | Grabianski | 446/93 |
| 2003/0030342 A1 * | 2/2003 | Chen et al. | 310/102 R |
| 2003/0073377 A1 | 4/2003 | Matasa et al. | 446/469 |

FOREIGN PATENT DOCUMENTS

| | | |
|---|---|---|
| GB | 2 067 421 | 7/1981 |
| JP | 2000-270239 | 9/2000 |
| JP | 2001-137561 | 5/2001 |
| JP | 2001-186714 | 7/2001 |
| JP | 2002-159759 | 6/2002 |
| JP | 2002-166064 | 6/2002 |

OTHER PUBLICATIONS

Futaba Digital Proportional R/C System, "3PK 3-Channel Radio Control System Instruction Manual," 2002, pp. 51-52, printed from www.hitecrcd.com/Radios/Discounted%20Radios/lynx3d.htm.

Hitec Racing, "Lynx 3D Instruction Manual", 2002, p. 4, printed from www.futaba-rc.com/manuals/3pk-manual.pdf.

* cited by examiner

TRANSMITTER FOR RADIO-CONTROLLED TOY

CROSS-REFERENCE TO RELATED APPLICATIONS

This invention relates to Wheel Assembly for a Toy (Inventor: Wai Hui), Assembly for Retaining a Toy (Inventor: Wai Hui), Toy Car Kit (Inventor: Wai Hui), and Radio Frequency Toy Controller Design (Inventor: Wai Hui) filed on the same day herewith.

FIELD OF THE INVENTION

The invention relates generally to mobile toys, and more particularly to certain improvements in such toys.

BACKGROUND

Many different types of toys are known and have become widespread and popular over the years. In particular, radio-controlled toys, such as radio-controlled cars, have become very popular with children over the years. A disadvantage of such toy cars, however, is that generally speaking they are fixed in design and cannot be changed. This means that a child can often become bored with them after a period of time. Furthermore, many children express satisfaction with being able to build or work on a toy themselves. Yet, many radio-controlled cars are complex and have components which are complicated and not easily adapted to be built or switched out by children. What is needed is a radio-controlled toy having easily interchangeable components such that a child may be able to build or customize their own toys.

Additionally, radio transmitters used by radio-controlled toys are often complex and difficult to operate. Some transmitters are used to charge the radio-controlled toys for use by providing a charging means on the transmitter for connecting to the toy. Often, it is difficult to tell whether charging has been completed, thereby wasting valuable power associated with the charging means. Therefore, what is needed is a transmitter having an easy to understand control panel.

A third aspect of this invention relates to an assembly for retaining a radio-controlled toy on a transmitter while it is being charged. It is often difficult to align the toy with the charging mechanism used to charge the toy. Furthermore, upon alignment, it is difficult to maintain a good connection between the charging mechanism and the toy, which can lead to intermittent, and therefore, inefficient charging. Therefore, what is needed, is an easy to use and reliable means for aligning and retaining the toy on the transmitter during charging.

DETAILED DESCRIPTION

Figure 1:
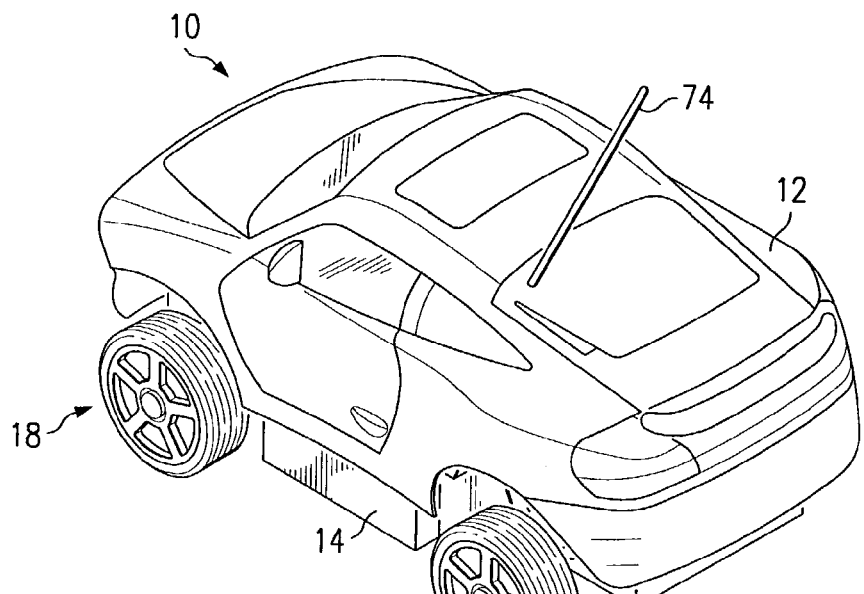
FIG. 1 is a perspective view of a toy car according to one embodiment of the invention.

Referring to FIG. 1, a toy car is generally referred to by reference numeral 10. The car 10 comprises a body 12 for connecting to a chassis 14. The body 12 may connect to the chassis 14 in a variety of ways including but not limited to a conventional pressure fit or a snap connection. Thus, the body 12 is interchangeable with the chassis 14.

Removable Hubcaps

The chassis 14 includes a rear axle arrangement (not depicted) for supporting a pair of substantially similar rear wheel assemblies 16 (one of which is shown) to provide the car 10 with mobility. The chassis 14 further includes a front independent suspension arrangement (not depicted) for supporting a pair of substantially similar front wheel assemblies 18 (one of which is shown).

Figure 2:
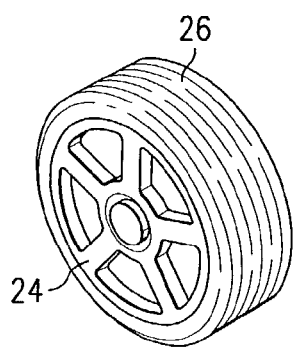
FIG. 2 is a perspective view of a rear wheel assembly associated with the toy car of FIG. 1.
Figure 3:
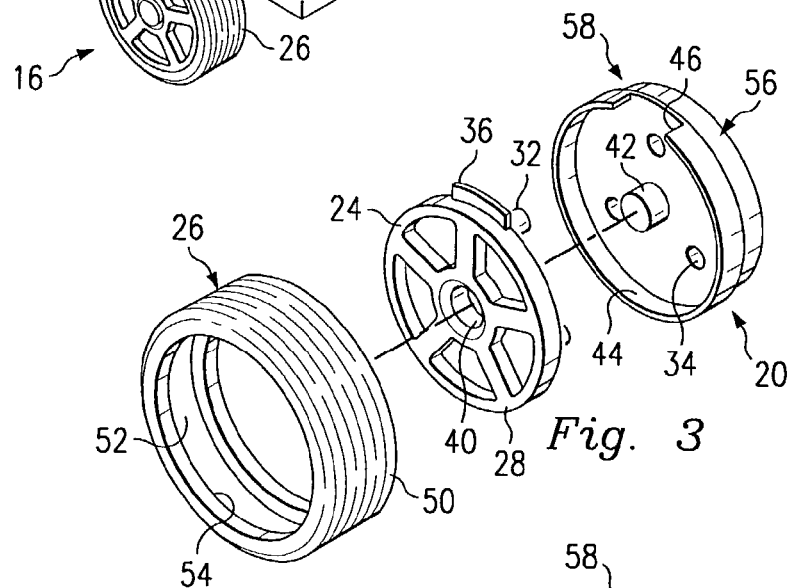
FIG. 3 is an exploded view of the wheel assembly of FIG. 2.
Figure 6:
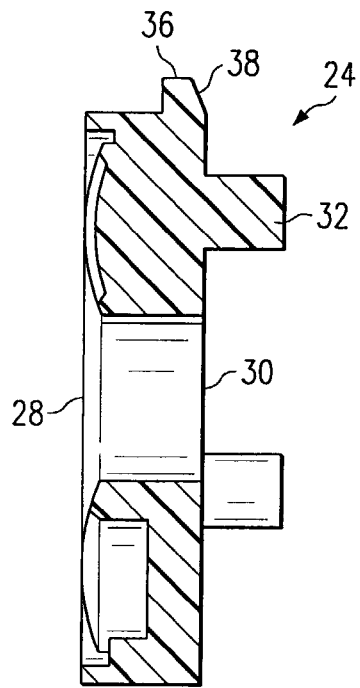
FIG. 6 is a side sectional view of a hubcap of the wheel assembly of FIGS. 2 and 4.

For clarity of description, one wheel assembly 16 will be described. Referring to FIGS. 2, 3, and 6, the wheel assembly 16 comprises a wheel 20 fixed to the axle arrangement for rotation therewith. The wheel assembly 16 further comprises a hubcap 24 adapted to be quick-detachable to the wheel 20. It is understood that quick-detachable means that the hubcap 24 may be attached to and detached from the wheel 20 without the use of tools. The wheel assembly 16 further comprises a tire 26 adapted to be quick-detachable to the wheel 20.

The hubcap 24 comprises a front portion 28 and a rear portion 30. The front portion 28 of the hubcap 24 may comprise a variety of different designs depending on the desired aesthetical nature of the hubcap. The rear portion 30 is the portion of the hubcap 24 that interfaces with the wheel 20. The rear portion 30 comprises at least one protrusion 32 extending away from the rear portion for engaging at least one corresponding bore 34 disposed through the wheel 20 to attach the hubcap 24 to the wheel. It will be understood that the hubcap 24 may comprise any number of protrusions 32 and the wheel 20 may comprise any number of corresponding bores 34. The engagement between the protrusion 32 and the bore 34 may comprise a variety of connections, such as a conventional snap connection. Furthermore, although the hubcap 24 is described as being quick-detachable to the wheel 20, the hubcap 24 may alternatively be attached to the wheel 20 in such a manner as to require the use of a tool for removal.

A circumferential edge of the hubcap 24 has a tab 36 extending radially outward from the hubcap. The tab 36 comprises a beveled side 38 sloping from the rear portion 30 of the hubcap 24 towards the front portion 28 of the hubcap. When the hubcap 24 is attached to the wheel 18, the tab 36 provides a means for disengaging the hubcap 24 from the wheel 20 in a quick-detachable manner.

Furthermore, a concentric bore 40 is formed through the hubcap 24 for receiving a corresponding hub 42 extending outwardly from the wheel 20. Such an arrangement provides a means for aligning the hubcap 24 with the wheel 20 during attachment of the hubcap to the wheel.

To further aid in alignment, the wheel 20 may comprise a rim 44 extruded along the radial outward side of the wheel. A slot 46 is formed in the rim 44 to receive the tab 36 during attachment. Thus, the bore 40 and the hub 42 along with the tab 36 and the slot 46 cooperate to provide a means for aligning the hubcap 24 and the wheel 20 during attachment of the hubcap to the wheel.

The tires 26 comprise an outer circumferential surface 50 and an inner circumferential surface 52. A variety of tread patterns may be formed on the outer surface 50 of the tires 26. The inner surface 52 comprises a channeled groove 54 formed to fit to an extruded ring 56 extending along a circumferential surface 58 of the wheel 20. Thus, the groove 54 and the ring 56 cooperate to provide a means for laterally retaining the tire 26 on the wheel 20. Furthermore, the tire 26 may be formed of an elastic material, such as rubber, so that the elastic properties of the tire radially retains the tire on the wheel 20.

Figure 4:
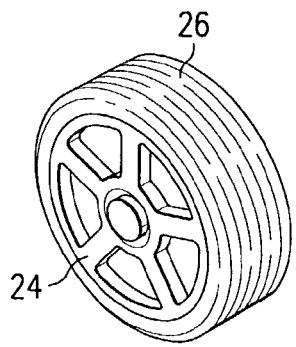
FIG. 4 is a perspective view of a front wheel assembly associated with the toy car of FIG. 1.
Figure 5:
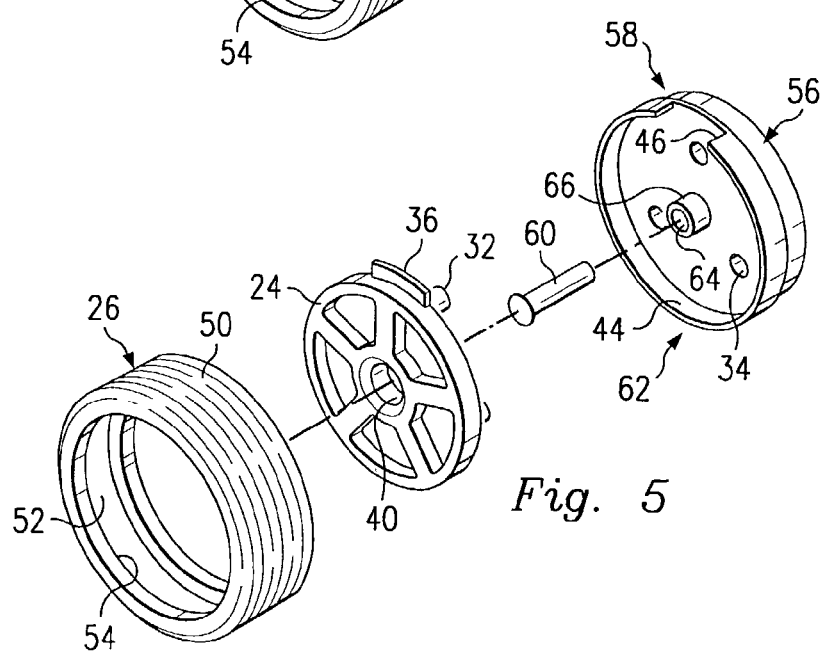
FIG. 5 is an exploded view of the wheel assembly of FIG. 4.

Referring now to the front wheel assemblies 18, one of which is shown in FIGS. 4 and 5, a shaft 60 of the independent suspension arrangement is adapted to receive a wheel 62 via a bore 64 formed through the wheel and an annular flange 66 of the wheel. The flange 66 extends in an outward direction from the wheel 62 in a coaxial relationship with the shaft 60. The shaft 60 is riveted at one end to provide a means for retaining the wheel 62 to the chassis 14. The remaining aspects of the wheel assembly 18 are substantially similar to the wheel assembly 16 described above and are therefore given the same reference numerals.

In operation, the hubcap 24 is aligned for attachment to the wheel 20 by aligning the hub 42 of the wheel with the corresponding bore 40 formed through the hubcap. The hubcap 24 may be similarly aligned for attachment to the wheel 62 by aligning the riveted end of the shaft 60 and the annular flange 66 with the corresponding bore 40 formed through the hubcap. The hubcap 24 may be further aligned with the wheel 20 by aligning the tab 36 with the corresponding slot 46 formed in the rim 44. Upon alignment, the hubcap 24 may be pressure fit to the wheel 20 by applying pressure to the hubcap in a direction towards the wheel.

If detachment of the hubcap 24 from the wheel 20 is desired, the hubcap may be detached by engaging the beveled side 38 of the tab 36 via a thin object, such as a fingernail or the like, and applying pressure on the tab in a direction away from the wheel. Thus, the hubcap 24 may be quick-detachably connected to the wheel 20. Such detachability allows a user to use many different types of hubcaps 24 with the car 10.

Once the hubcap 24 has been attached to the wheel 20, the tire 26 may be attached to the wheel to complete the wheel assembly 16. The tire 26 may be fitted to the wheel by aligning the groove 54 with the ring 56 of the wheel 20. Thus, like the hubcaps 24, the tires 26 may be quick-detachably connected to the wheel 20, which allows the user to use many different types of tires 26 with the car 10.

Transmitter

Figure 7:
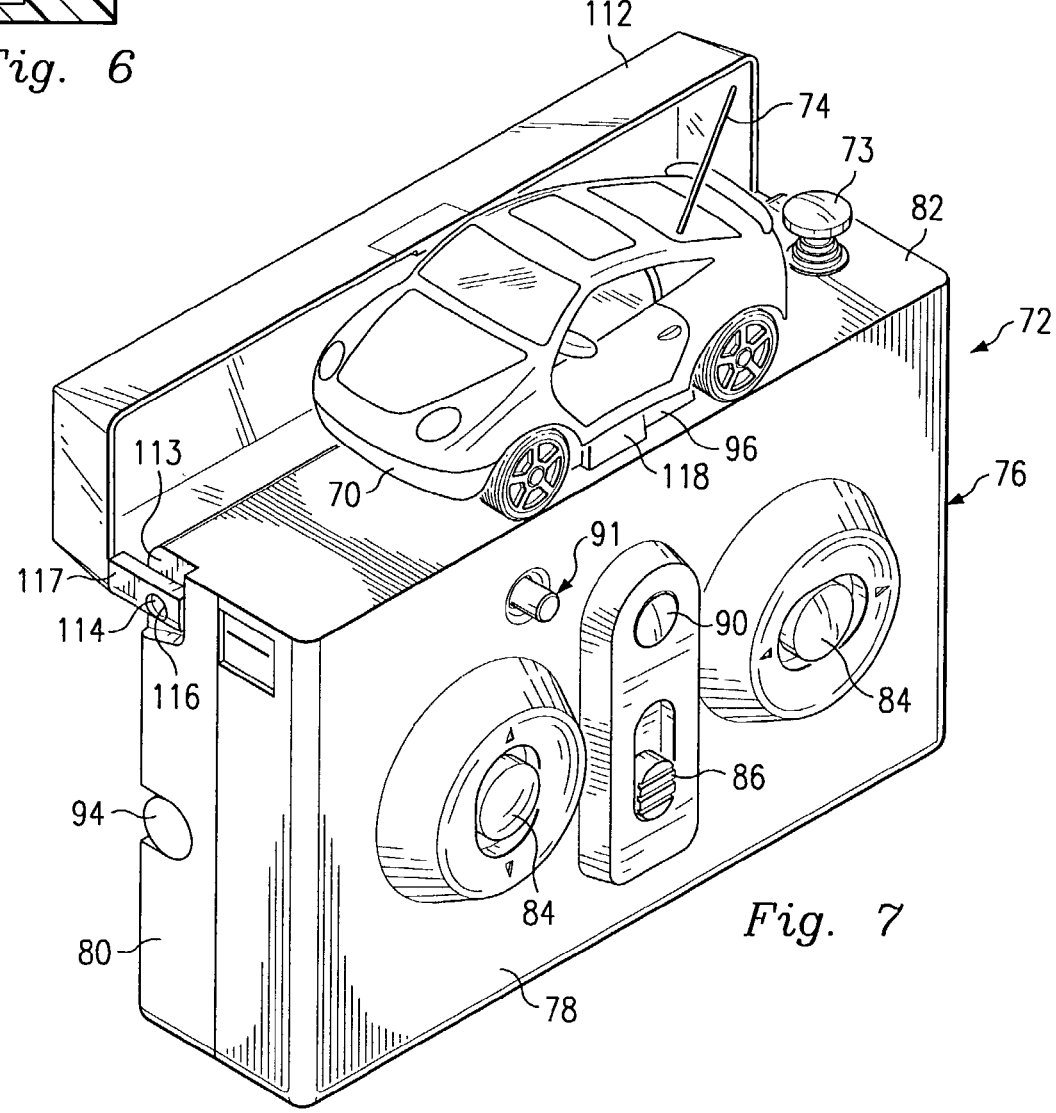
FIG. 7 is a perspective view of a toy car and a transmitter according to another aspect of the invention.
Figure 8:
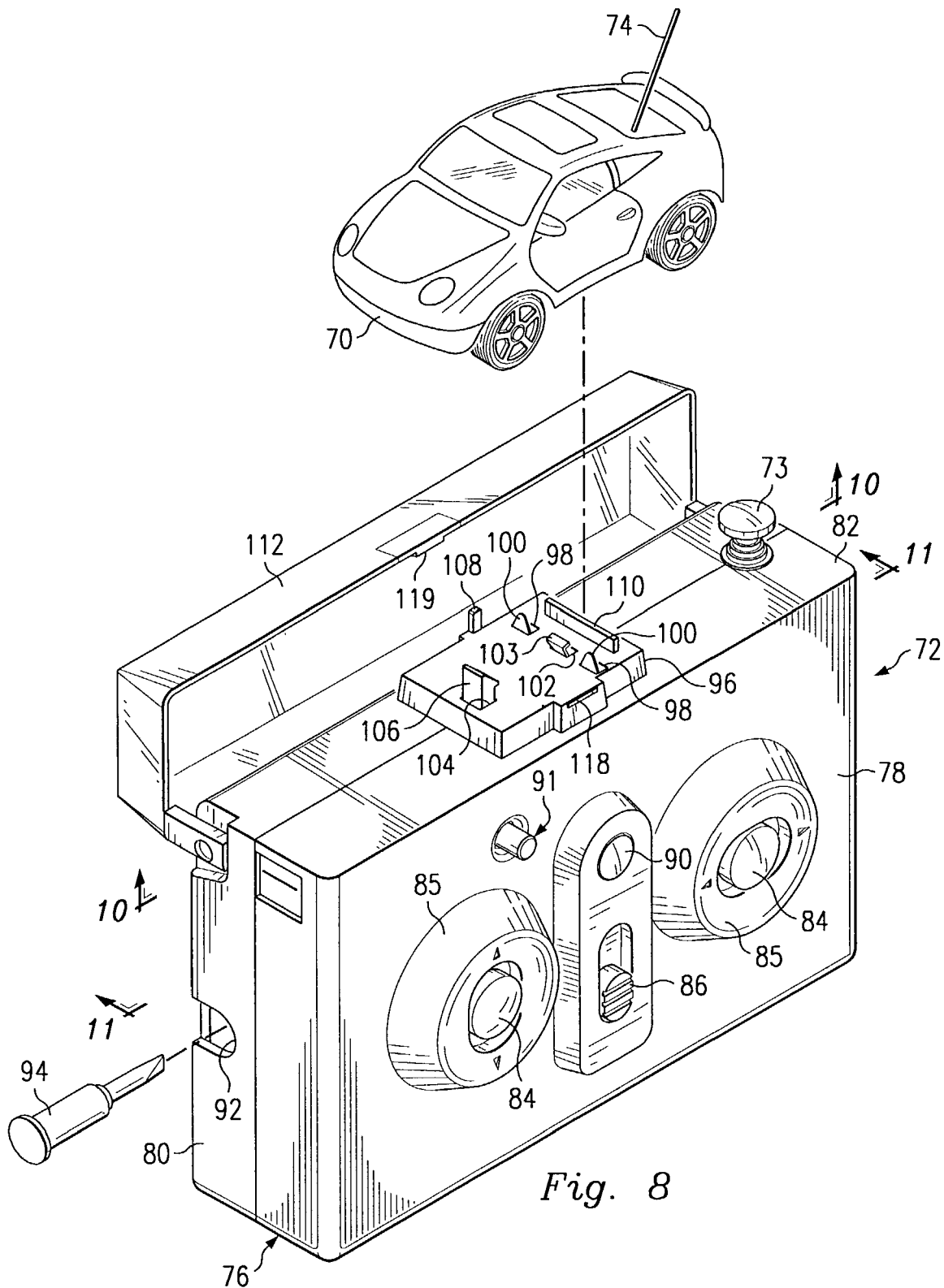
FIG. 8 is an exploded view of the toy car and transmitter of FIG. 7.

Referring to FIGS. 7 and 8, in an alternative embodiment, a radio-controlled toy car 70 is depicted, which requires the use of a wireless controller, or alternatively described as a transmitter, 72 to transmit radio signals for operation of the car in a conventional manner. The car 70 is substantially similar to the car 10 described previously except that the car 70 is adapted to receive radio signals for operation thereof. The transmitter 72 comprises an antenna 73 to send radio signals to a corresponding antenna 74 disposed on the car 70. It will be understood that the antenna 74 is operatively connected to a wireless receiver (not depicted) to receive the radio signals from the transmitter 72. In some embodiments, the antenna 74 may comprise a telescoping arrangement.

The transmitter 72 comprises a housing 76 having a front 78, a side 80, and a top 82. The front 78 of the housing 76 comprises a control panel, such as a pair of controls 84, which may be actuated by a user to control movement of the car 70 via a control circuit (not shown) within the transmitter 72. The controls 84 are housed within raised portions 85 of the housing 76. The front 78 of the housing 76 further comprises a switch 86 for activating the control circuit and a charging circuit located within the transmitter 72 to be described with reference to FIG. 9. A transparent indicator casing 90 is disposed above the switch 86 for housing a three-way indicator, such as an LED, also to be described with reference to FIG. 9. Furthermore, a release button 91 is disposed on the front 78 of the housing 76 and proximate to the controls 84 for providing a means for releasing the car 70 from the transmitter 72 to be described with reference to FIGS. 10 and 11.

A recess 92 may be formed in the side 80 of the housing 76 for releasably retaining a tool 94, such as a screwdriver, associated with the car 70. The tool 94 may be releasably retained via a conventional pressure fit. It will be understood that the tool 94 may be releasably retained within the housing 76 in a variety of ways. Furthermore, the recess 92 may be formed in a variety of locations within the housing 76.

The top 82 of the housing 76 comprises a charging pad 96 for charging a battery (not shown) housed within the car 70. A pair of slots 98 are formed through the charging pad 96 for allowing a plug 100 associated with the charging circuit to pass there through for engaging a corresponding jack (not shown) associated with the car 70. An additional slot 102 is formed through the charging pad 96 for allowing a spring 103 to pass there through for supporting the car 70 on the charging pad. A further additional slot 104 is formed through the charging pad 96 for allowing a catch 106 operatively connected to the release button 91 to pass there through. The catch 106 is adapted to engage a corresponding groove (not shown) formed on the underside of the car 70 to releasably retain the car on the transmitter 72 in a manner to be described with reference to FIGS. 10 and 11. The catch 106 also aids in aligning the car 70 on the charging pad 96 during placement of the car on the charging pad for charging.

A flange 108 and a lip 110 are disposed on and extend away from the charging pad 96 to provide a further means for aligning the car 70 on the charging pad during placement of the car on the charging pad for charging.

A cover 112 is operatively connected to the housing 76 for enclosing the charging pad 96 and the antenna 73 during nonuse. The housing 76 of the transmitter 72 comprises a step-down portion 113 for accommodating movement of the cover 112 from an open position to a closed position. A protrusion 114 extends from the step-down portion 113 for receiving a corresponding bore 116 formed through a flange 117 of the cover 112 for connecting the cover to the housing 76. It will be understood that the opposite portion of the cover 112 comprises a substantially similar arrangement.

A stepped flange 118 further extends from the charging pad 96 and is adapted to engage a lip 119 of the cover 112 to secure the cover in a closed position.

Figure 9:
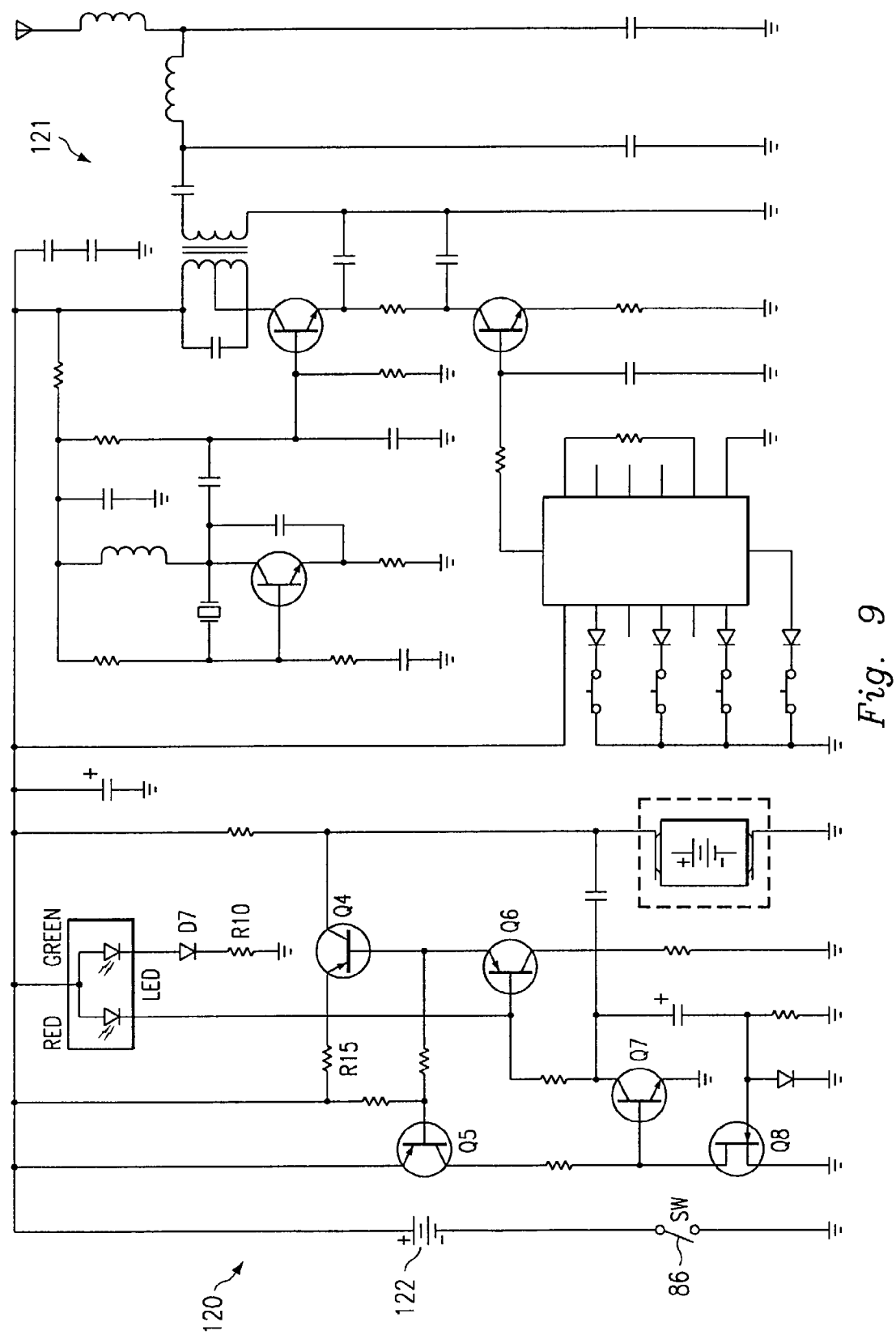
FIG. 9 is a schematic view of the transmitter of FIG. 7.

Referring to FIG. 9, there is illustrated a schematic circuit for the transmitter 72. The circuit comprises a charging circuit 120 for transferring power to the rechargeable battery (not shown) of the car 70, and a transmitting circuit 121 for sending radio signals to the car. The charging circuit 120 may be activated by manipulation of the switch 86 by the user. The charging circuit 120 utilizes a transistor Q4 to control the flow of current through a current limiting resistor R15. The transistor Q4 is in turn controlled by a timer transistor Q8, which ends the current transmission at a predetermined cutoff time. The predetermined time is controlled by a resistor/capacitor combination that is connected to the gate of the resistor Q8. The drain of the transistor Q8 is connected to the base of a transistor Q7 and the collector of a transistor Q5. It is understood that while specific resistor types (e.g., bipolar junction transistors and field effect transistors) are utilized in the present illustration, different types of transistors may be substituted.

An indicator, which for purposes of illustration is a multi-color light emitting diode (LED) able to produce red or green light, may be connected to the circuit and used to indicate a state of the circuit. A first anode (for red light) of the LED is connected to the base of a transistor Q6 and a second anode (for green light) of the LED is connected to ground through a diode D7 and a resistor R10. The LED's common cathode is connected to a power source 122. The behavior of the charging circuit and its various states may be indicated by means of the LED as follows.

Prior to activation of the circuit 120, the LED will not be illuminated, thus indicating that the transmitter is off. Upon activation of the circuit 120 but prior to charging of the car 70, current will pass through the second anode of the LED, producing green light and indicating that the transmitter is on. Upon contact between the plug 100 and the corresponding jack of the car 70, current will pass through the first anode of the LED, producing red light and indicating that the transmitter is charging the car. Finally, upon expiration of the predetermined cutoff time, the LED may revert back to the green color to indicate completion of charging of the car 70. The various states of the circuit, and therefore the transmitter, are displayed to the user via the indicator casing 90 (FIGS. 7 and 8).

Release Assembly

Figure 10:
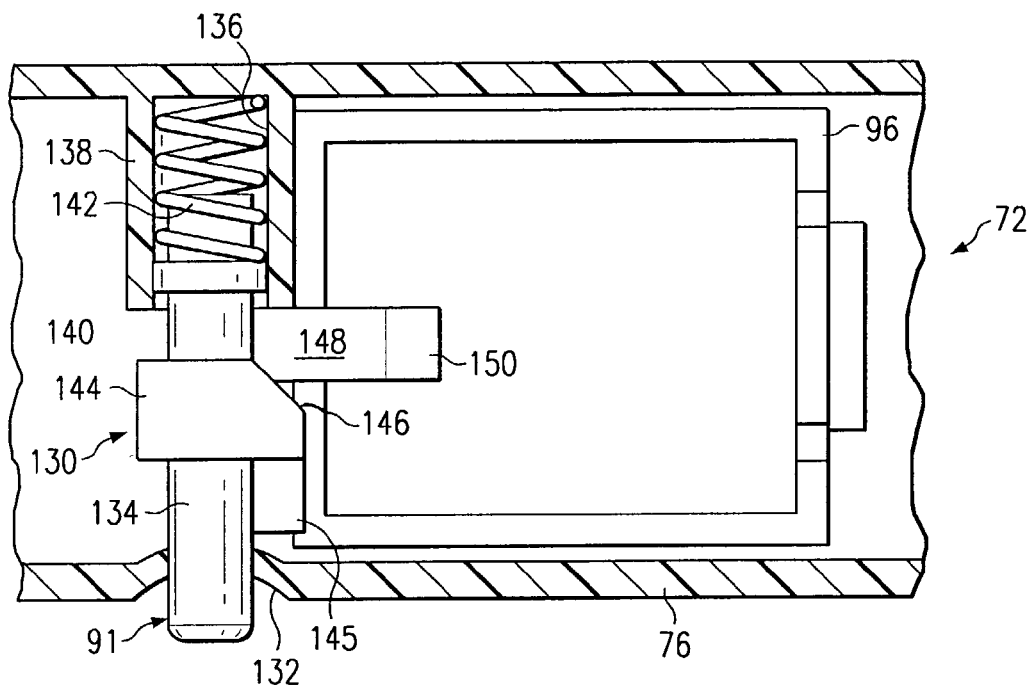
FIG. 10 is a partial bottom sectional view of the transmitter taken along the line 10-10 depicted in FIG. 8.
Figure 11:
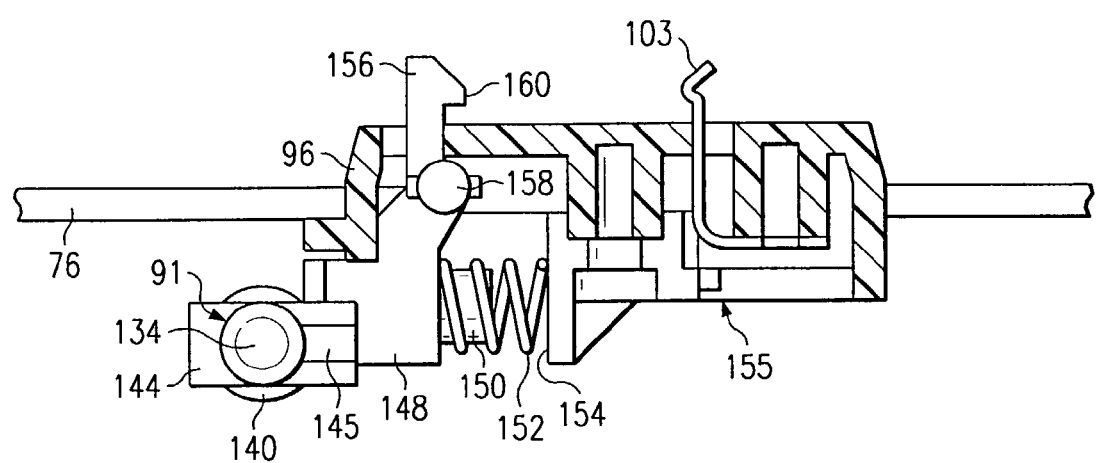
FIG. 11 is a partial side sectional view of the transmitter taken along the line 11-11 depicted in FIG. 8.

Referring to FIGS. 10 and 11, the transmitter 72 may house a release assembly 130 for releasably retaining the car 70 on the charging pad 96. The release assembly 130 includes the release button 91, which is disposed through a bore 132 formed in the housing 76 of the transmitter 72. The button 91 comprises a rod 134 extending from the exterior of the housing 76 through the bore 132 and into an annular recess 136 defined by a sleeve structure 138 within the housing 76.

A rim 140 is formed integrally with the rod 134 and extends around a portion of the rod 134. It will be understood that the rim 140 may alternatively be a separate component that attaches to the rod 134 in a coaxial relationship with the rod. A coil spring 142 is coaxially positioned about a portion of the rod 134 adjacent to the rim 140 and into the annular recess 136. The rim 140 engages the spring 142 to provide a means for biasing the rod 134 against the inside surface of the housing 76 via a stop 143 associated with the rod. The diameter of the sleeve 138 is substantially the same as the diameter of the spring 142. Therefore, the rim 140, the spring 142, and the rod 134 are stably maintained in the sleeve 138 formed within the transmitter 72.

The button 91 further comprises a flange 144 having a beveled surface 146 for engaging an actuator 148 associated with the button. The actuator 148 comprises a stepped portion 150 having a coiled spring 152 positioned coaxially there about. The spring 152 abuts a fixed surface 154 and provides a means for biasing the actuator 148 against the flange 144. It will be understood that the fixed surface 154 is formed of additional structure 155 that is not pertinent and will not be discussed.

The actuator 148 is coupled to a catch 156 via a coupling device 158. The coupling device 158 is adapted to impart opposing motion, in a lateral direction, between the actuator 148 and the catch 156 upon depression of the button 91. The catch 156 comprises an elongated surface 160 at its distal end for engaging and retaining the car 70 on the transmitter 72. The catch 156 extends from the transmitter 72 in a direction substantially perpendicular to the longitudinal axis of the button 91. The resulting orientation of the catch 156 and the button 91 is ergonomically advantageous as it minimizes the user's movement to depress the button and remove the car 70 from the transmitter 72.

In operation, the car 70 may be charged for use by aligning the catch 156 with the corresponding groove formed on the car and applying pressure to the car in a direction towards the transmitter 72 to snap the car into the charging position. If further alignment is necessary, the flange 108 and the lip 110 may be used to align the car 70 on the charging pad 96. Upon arranging the car 70 on the charging pad 96, the charging circuit may be activated by actuating the switch 86. Upon activation, the indicator emits a red color, which can be seen via the indicator casing 90, to indicate charging of the car 70.

When charging of the car 70 is completed, as indicated by the indicator emitting a green color, the car may be released from the charging pad 96 by depressing the release button 91 and pulling the car in a direction away from the transmitter 72. By releasably retaining the car 70 on the transmitter 72 via the release assembly 130, difficulties associated with charging radio-controlled cars, such as unstable connections, can be avoided. Upon release of the car 70 from the transmitter 72, the car may be controlled via the transmitter in a conventional manner by manipulation of the controls 84.

Toy Kit

Figure 12:
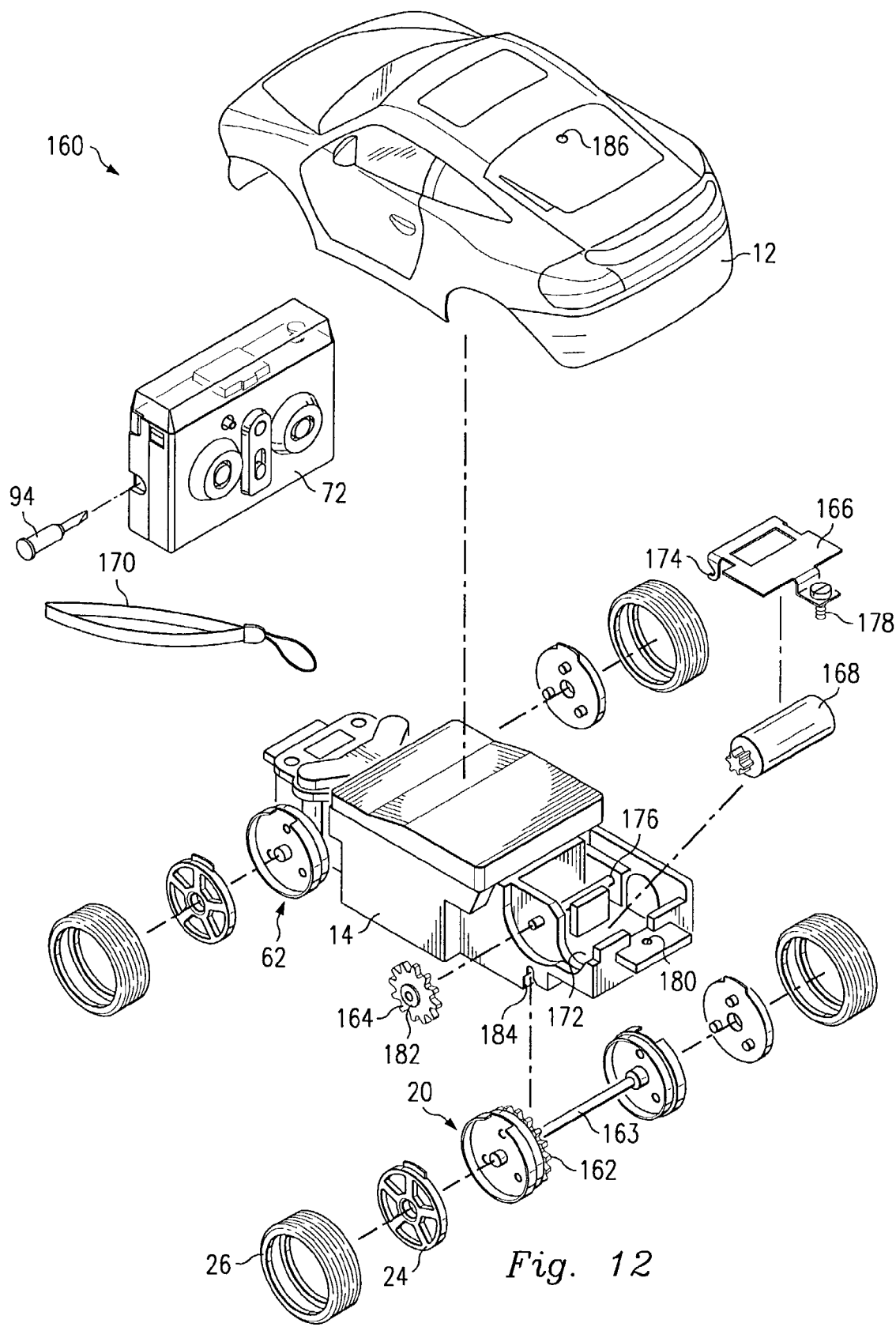
FIG. 12 is an isometric view of a kit to be used with the invention.

In another embodiment of the present invention, a kit 160 for providing various unassembled components of the car 70 is depicted in FIG. 12. The kit 160 may include any of the components discussed above, including the body 12, the chassis 14, the wheels 20 and 62, the removable hubcaps 24, the tires 26, the transmitter 72, and the tool 94. The kit may further comprise a rear axle gear 162 and an axle 163, a transfer gear 164, a motor clip and screw assembly 166, and a motor with drive gear 168. It will be understood that the motor with drive gear 168 provides power to the car 70. Furthermore, a wrist strap 170 may be included for attaching to the transmitter 72 to prevent accidental dropping of the transmitter.

In operation, according to one embodiment, the car 70 may be assembled by first assembling the front wheel assemblies 18 in the manner described above. The motor with drive gear 168 may then be inserted into a motor compartment 172 disposed in the chassis 14. Upon insertion of the motor 168, the motor retaining clip and screw assembly 166 may be fitted over the motor by engaging a pair of hooks 174 with a rod 176 secured to the chassis 14, and further threading a screw 178 of the assembly to a corresponding threaded bore 180 disposed through the chassis. The tool 94 may be used to aid insertion of the screw 178 into the bore 180. The transfer gear 164 may then be inserted onto a portion of the rod 176 extending from the chassis 14 via a bore 182 disposed through the gear 164. Upon attachment of the transfer gear 164, the axle 163 may be snap-fitted into a corresponding groove 184 of the chassis 14, thereby also assembling the axle gear 162 on the chassis. Thus, the drive gear of the motor 168 engages with the transfer gear 164, which thereby engages with the axle gear 162. Next, the rear wheel assemblies may be assembled in the manner described above. Finally, the antenna (not shown) may be threaded through a bore 186 formed through the body 12 and the body snap-fitted to the chassis 14. It will be understood that the above steps of assembly are for example only and the assembly of the car 70 may comprise a different order of steps. It will be further understood that the above components of the kit 160 may comprise a housing (not shown) for maintaining the components of the kit in an enclosed space.

The kit 160 may be further modified by providing additional bodies 12 for providing the user with the option of interchanging body styles with the chassis 14. Furthermore, the body 12 and the hubcaps 24 may resemble actual body and hubcap styles to associate the car 70 with actual cars.

In addition to the utility of operating the car 70, the user gains the added utility of assembling the car using the above-described components of the kit 160.

It is understood that the above spatial references, such as "radial," "lateral," "inward," and "outward," are for the purpose of illustration only and do not limit the specific orientation or location of the structures described above.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. A transmitter for a radio-controlled toy, comprising:
   a housing having a front, a side and a top;
   a control circuit located within the housing;
   a charging circuit located within the housing;
   a switch extending from the front of the housing and user-operable to activate the control circuit and the charging circuit;
   a plug associated with the charging circuit and configured to engage a corresponding jack associated with the radio-controlled toy;
   an antenna extending from the top of the housing and operably coupled to the control circuit;
   a pair of controls housed within raised portions of the front of the housing and user-operable to control movement of the radio-controlled toy via the control circuit;
   a three-way LED indicator located on the front of the housing and configured to indicate an operational mode of the transmitter;
   a charging pad located on the top of the housing and configured to charge a battery housed within the radio-controlled toy;
   a spring configured to support the radio-controlled toy on the charging pad;
   a catch operatively connected to the release button and configured to engage a corresponding groove formed on the underside of the radio-controlled toy to releasably retain the radio-controlled toy on the charging pad;
   a release button extending from the front of the housing and user-operable to release the radio-controlled toy from the catch;
   wherein the charging pad includes:
      first and second slots through which the plug passes for engaging the corresponding jack associated with the radio-controlled toy;
      a third slot through which the spring passes; and
      a fourth slot through which the catch passes; and
   a release assembly configured to releasably retain the radio-controlled toy on the charging pad, the release assembly comprising:
      the release button, which is disposed through a bore formed in the front of the housing, the release button including a rod extending from the exterior of the housing through the bore and into an annular recess defined by a sleeve structure located within the housing;
      a rim extending around at least a portion of the rod in a coaxial relationship;
      a coil spring coaxially positioned about a portion of the rod adjacent to the rim and into the annular recess, wherein the spring biases the rod against an inside surface of the housing via a stop associated with the rod; and
      a flange having a beveled surface engaging an actuator associated with the button, the actuator comprising a stepped portion having a coiled spring positioned coaxially there about, wherein the spring abuts a fixed surface and biases the actuator against the flange;
   wherein the actuator is coupled to the catch via a coupling device that is configured to impart opposing motion, in a lateral direction, between the actuator and the catch upon depression of the release button;
   wherein the catch comprises an elongated surface at its distal end for engaging and retaining the radio-controlled toy on the transmitter; and
   wherein the catch extends from the housing in a direction substantially perpendicular to the longitudinal axis of the release button.

2. The transmitter of claim 1 wherein the charging pad further comprises a flange and a lip each extending away from the charging pad and configured to align the radio-controlled toy on the charging pad during charging.

3. The transmitter of claim 1 further comprising a cover operatively connected to the housing and configured to enclose the charging pad and the antenna during non-use, wherein:
   the housing comprises a step-down portion configured to accommodate movement of the cover from an open position to a closed position; and
   a stepped flange extending from the charging pad is configured to engage a lip of the cover to secure the cover in the closed position.

4. The transmitter of claim 3 wherein:
   a first protrusion extends from the step-down portion for receiving a first bore formed through a first flange of the cover;
   a second protrusion extends from the step-down portion for receiving a second bore formed through a second flange of the cover, wherein the first and second protrusions extend in opposite directions; and
   the first and second protrusions cooperate with the first and second bores, respectively, for rotatably connecting the cover to the housing.

5. The transmitter of claim 1 wherein the catch extends substantially perpendicularly from the top of the housing, wherein the release button extends substantially perpendicularly from the front of the housing, and wherein the top and the front of the housing are substantially perpendicular.

* * * * *